(12) United States Patent
Sparks et al.

(10) Patent No.: US 7,483,805 B2
(45) Date of Patent: Jan. 27, 2009

(54) SENSING AND ANALYSIS SYSTEM, NETWORK, AND METHOD

(75) Inventors: Douglas Ray Sparks, Whitmore Lake, MI (US); Vincent Cruz, Farmington Hills, MI (US); Nader Najafi, Ann Arbor, MI (US)

(73) Assignee: Integrated Sensing Systems, Inc., Ypsilanti, MI (US)

( * ) Notice: Subject to any disclaimer, the term of this patent is extended or adjusted under 35 U.S.C. 154(b) by 0 days.

(21) Appl. No.: 11/688,399

(22) Filed: Mar. 20, 2007

(65) Prior Publication Data

US 2008/0154535 A1 Jun. 26, 2008

Related U.S. Application Data

(60) Provisional application No. 60/877,040, filed on Dec. 26, 2006.

(51) Int. Cl.
*G06F 19/00* (2006.01)
(52) U.S. Cl. ........................ 702/130; 436/147
(58) Field of Classification Search ................ 702/130, 702/23, 182–185, 188; 436/147; 374/100; 324/464, 465, 514
See application file for complete search history.

(56) References Cited

U.S. PATENT DOCUMENTS

2005/0158701 A1* 7/2005 West .......................... 435/3
2006/0229506 A1 10/2006 Castellanos

OTHER PUBLICATIONS

Carsten W. Mundt, et al; A Multiparameter Wearable Physiologic Monitoring System for Space and Terrestrial Applications; IEEE Transactions on Information Technology in Biomedicine, vol. 9, No. 3, Sep. 2005. 1089-7771.

* cited by examiner

*Primary Examiner*—Edward Raymond
(74) *Attorney, Agent, or Firm*—Hartman & Hartman, P.C.; Gary M. Hartman; Domenica N. S. Hartman (57) ABSTRACT

A sensing and analysis system, method, and network that make use of a very portable and compact sensor unit and a physically separate electronic unit that serves to power and control the sensor unit, process and optionally display the output of the sensor unit, and transmit the sensor output to other locations, such as over a network. The sensor unit includes a housing, a sensing element within the housing and responsive to an input, and electronic circuitry within the housing and in communication with the sensing element to produce an electrical output based on an output signal generated by the sensing element. A communication providing device delivers instructions generated by the electronic unit to the sensor unit and delivers the electrical output from the sensor unit to the electronic unit.

50 Claims, 4 Drawing Sheets

SENSING AND ANALYSIS SYSTEM, NETWORK, AND METHOD

CROSS REFERENCE TO RELATED APPLICATIONS

This application claims the benefit of U.S. Provisional Application No. 60/877,040 filed Dec. 26, 2006, the contents of which are incorporated herein by reference.

BACKGROUND OF THE INVENTION

The present invention generally relates to sensing and analysis systems and methods, for example, sensing and analyzing properties, conditions, and substances present within the environment, and physiological conditions and substances present within humans. More particularly, this invention relates to sensing and analysis systems, networks, and methods that make use of a sensor unit that is very portable, compact, and operates in combination with a physically separate electronic computational and communication device that can be configured to power and control the sensor unit and process the output of the sensor unit, such that the sensor unit is not required to contain components necessary to carry out these functions. The computational and communication device can be part of a network, optionally containing other sensor units and computational and communication devices, enabling remote communications with the sensor unit including dissemination of its output and remotely-generated instructions.

Chemical and fluid analysis equipment generally sense and analyze a sample of a material (gas, liquid, or solid) for the presence or amounts of constituents within the sample or other physical or chemical properties of the sample. Conventional equipment for performing chemical and/or fluid analysis are typically large, standalone units equipped with a dedicated display, keypad, data processing capability, and control algorithm. These equipment typically consume a considerable amount of power, necessitating an AC power supply for continuous operation, though may be equipped with a large battery for temporary operation when an AC power supply is unavailable. Current equipment are at times equipped to be linked to a computer, such as through an RS-232 serial communications cable, enabling data to be sent to the computer, which can then store, manipulate, and print the raw or manipulated data. The computer may be part of a wireless network, allowing the raw or manipulated data to be communicated to a remote location.

The size, weight, and cost of conventional chemical and fluid analysis equipment limit their ability to be widely used at remote locations where analysis is often necessary, and also limit their ability to be used at multiple locations where sensing and monitoring would be beneficial, such as when monitoring conditions and hazards within the environment. The power consumption requirements for wireless communications is also a significant limitation when attempting to implement wireless sensing equipment on a conventional network. Power consumption limits the distance a wireless sensor can be located from its network receiver, with higher power level requirements necessitating an increase in the size or volume of the wireless sensor node.

Various advancements have been proposed for wireless and wired sensors and sensor networks, examples of which include U.S. Pat. No. 6,338,010 to Sparks et al., C. Hsin et al., "Randomly Duty-Cycled Wireless Sensor Networks: Dynamics of Coverage," IEEE Trans. On Wireless Communications, Vol. 5, No. 11, p. 3182-3192 (November 2006), K. Wise, "Wireless Integrated Microsystems: Coming Revolution in Gathering of Information," NSTI Nanotech '06, Boston, Mass., p. 455-458 (May 2006), F. Kocer et al., "A New Transponder Architecture with On-Chip ADC for Long-Range Telemetry Applications," Journal Solid-St Cir., Vol 41, No. 5, p. 1142-1148 (May 2006), and D. Sparks et al., "Multi-Sensor Modules with Data Bus Communication Capability," Proceedings of the Spring SAE Conf., No. 1999-01-1277, p. 1 (1999). Nonetheless, there is a continuing need for more versatile sensing and analysis systems, networks, and methods.

BRIEF SUMMARY OF THE INVENTION

The present invention provides a sensing and analysis system, method, and network that make use of a very portable and compact sensor unit and a physically separate electronic unit that serves to power and control the sensor unit, process and optionally display the output of the sensor unit, and transmit the sensor output to other locations, such as over a network.

The sensing and analysis system of this invention includes the portable sensor unit, the electronic unit, and one or more links that allow communication and power transfer between the electronic circuitry and the electronic unit. The sensor unit comprises a housing, a sensing element within the housing and responsive to an input, and electronic circuitry within the housing and in communication with the sensing element to produce an electrical output based on an output signal generated by the sensing element. The electronic unit is physically separate from the sensor unit and capable of generating instructions for the sensor unit, receiving the electrical output from the sensor unit, processing the electrical output, and transmitting the electrical output to remote locations. The link delivers power and instructions generated by the electronic unit to the sensor unit, and delivers the electrical output from the sensor unit to the electronic unit. The communication capability of the electronic unit preferably enables a sensing network to be established with the sensing unit.

The sensing and analysis method of this invention includes using a portable sensor unit to sense an input with a sensing element within the portable sensor unit, generate an output signal with the sensing element, and produce an electrical output based on the output signal generated by the sensing element. The electrical output is then communicated to an electronic unit physically separate from the sensor unit, and the electronic unit is operated to deliver power to the sensor unit, generate instructions to the sensor unit, receive and process the electrical output from the sensor unit, and transmit the electrical output to remote locations.

The sensing and analysis system and method of this invention can be adapted for a variety of diverse applications, including but not limited to sensing and analyzing conditions in the environment, such as detecting, monitoring, amplifying, sorting, filtering, analyzing, and measuring such hazards as pollutants, radiation, explosives, biochemical agents, pathogens, chemical toxins, etc., in the air, water or other fluid, and sensing and analyzing conditions in the human body such as detecting, measuring, and analyzing bodily fluids for the presence or levels of various biological and biochemical substances and agents. A key feature of the invention is that the electronic unit performs the tasks of generating instructions to the sensor unit, processing of the sensor unit output, providing power to the sensor unit, and performing all network communications for the sensor unit, thus drastically reducing the size, cost, and complexity of the sensor unit. Furthermore, this aspect of the invention enables the sensor unit to be used in a large network of sensor units. The sensor unit can be configured to be connected to the electronic unit by a variety of methods, including universal serial bus (USB) and mini-USB interfaces (both as designated by the USB Implementers Forum (USB-IF)), RS-232 and RS-488 cables, and wireless devices. The electronic unit can take the form of a personal computer (PC), workstation (WS), computer, laptop, personal digital assistant (PDA), cellular phone, satellite phone, or any other portable electronics device with data processing capability and equipped for communication with the sensor unit.

Other objects and advantages of this invention will be better appreciated from the following detailed description.

DETAILED DESCRIPTION OF THE INVENTION

Figure 1:
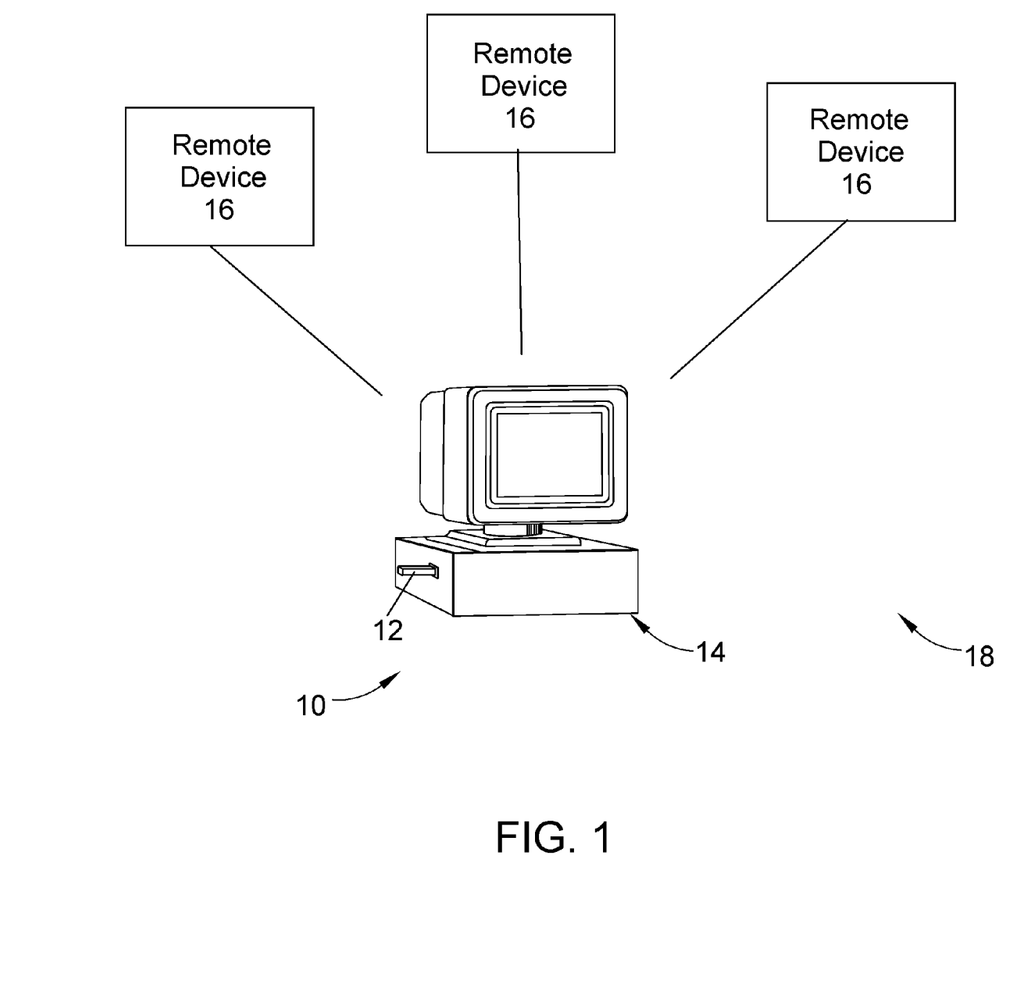
FIG. 1 is a schematic representation of a sensing and analysis system comprising a sensor unit plugged into a USB port of a computer, which in turn is part of a network that enables the computer to communicate with remote devices within the network in accordance with a preferred aspect of this invention.

With reference to FIG. 1, a sensing and analysis system 10 is shown to include a sensor unit 12 plugged into a port on a personal computer 14. The computer 14 is represented as being in communication with a number of remote devices 16 having data processing capabilities, at least some of which may also be equipped with sensor units that may be identical or similar in construction to the sensor unit 12. Together, the computer 14 and remote devices 16 form a network 18 in which they are able to communicate with each other wirelessly or through network cables. While a single sensor unit 12 is shown connected to the computer 14, multiple sensor units 12 could be connected through different ports to the computer 14 or linked via the network 18.

As evident from FIG. 1, the sensor unit 12 is a small portable device configured to be plugged into the computer 14. In the preferred embodiment of FIG. 1, the connection between the sensor unit 12 and computer 14 is via a universal serial bus (USB) communication port, though connection through a mini-USB port, a RS-232 or RS-488 serial cable, IEEE connector, or a wireless connection (such as RF, IR and optical) is also within the scope of the invention. While shown as being directly plugged into a USB port of the computer 14, a cable can be used to connect the sensor unit 12 and the computer 14 to provide greater physical separation between the sensor unit 12 and computer 14, thereby increasing the physical flexibility when using and orienting the sensor unit 12, as well as protecting the computer 14 from the operating environment and hazards associated with the operation of the unit 12. While the computer 14 is represented as a personal computer (PC), the computer 14 is generically representative of a wide variety of electronic devices with computational, communication, and/or data processing capabilities, including workstations (WS), laptops, notebooks, PDA's, cellular phones, satellite phones, etc. As such, the term "computer" in reference to the drawings and following discussion should be interpreted as encompassing each of these electronic devices, as should the remote devices 16. According to a preferred aspect of the invention, most and preferably all user interface tasks for the sensor unit 12 are accomplished with or through the computer 14. For example, the computer 14 can be used to calibrate, program, and control the sensor unit 12, process, manipulate, store, and display data obtained from the sensor unit 12, and subsequently transmit the raw and/or processed data to the network 18. With the use of USB connectors, various bus protocols can be employed to share data and instructions between the computer 14 and sensor unit 12, such that the sensor unit 12 may operate as another peripheral hardware device similar to a printer.

Figure 2:
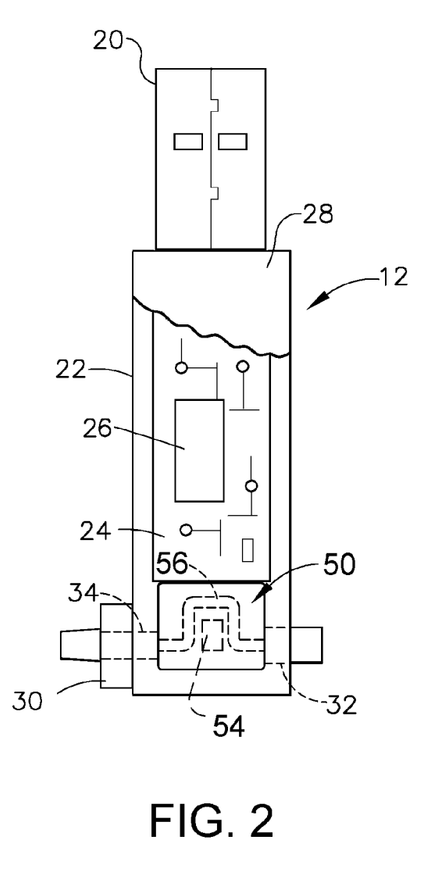
FIGS. 2 and 3 are schematic representations of two embodiments of sensor units configured for operation in the system of FIG. 1.
Figure 3:
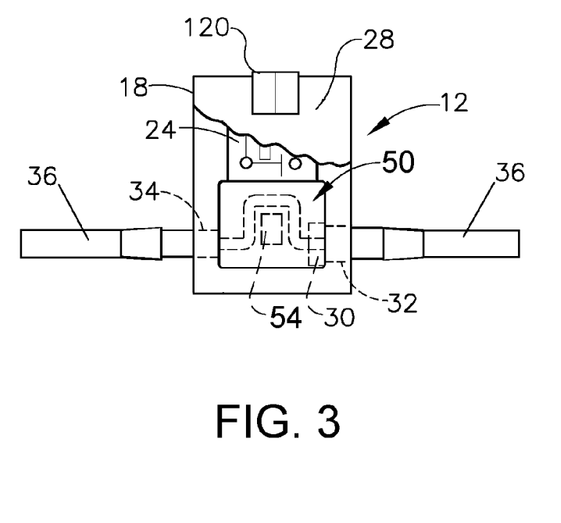

FIGS. 2 and 3 represent two embodiments of the sensor unit 12, with outer covers 28 shown in partial section to expose certain components within the unit housings 22. In each of these embodiments, the housing 22 is portrayed as containing a MEMS (microelectromechanical system) sensing element 56 on a MEMS chip 50, though other types of sensing elements are also within the scope of the invention, as discussed below. The sensing elements 56 are each represented as a tube through which a fluid (gas or liquid) entering the housing 22 through an inlet port 32 flows before exiting the housing 22 through an outlet port 34. As will be explained in more detail below, a thermal element 54 can be located in proximity to each sensing element 56, by which the temperature of the sensing element 56 and fluid flowing therethrough can be sensed and adjusted. Each housing 22 also contains a printed circuit board (PCB) 24 with electronic circuitry (schematically represented) through which control signals to the MEMS chip 50 are fed and output signals from the MEMS chip 50 are received.

The embodiments of FIGS. 2 and 3 primarily differ as a result of the sensor unit 12 of FIG. 2 being equipped with a standard USB connector 20, whereas the sensor unit 12 of FIG. 3 is equipped with a mini-USB connector 120. Additional differences include the sensor unit 12 of FIG. 2 being equipped with a pump 30 on the housing 22 adjacent the outlet port 34 to draw fluids through the sensing element 56 and assist in evacuating the sensing element 56, whereas the sensor unit 12 of FIG. 3 is equipped with a pump 30 within the housing 22 adjacent the inlet port 32 for the same purpose. The embodiment of FIG. 3 is depicted as being further equipped with in-line tubing 36 that allows for continuous flow of a fluid through the sensing element 56. The in-line tube 36 of FIG. 3 is well suited for interfacing with multiple sample test systems that can sample many different vials or array wells in sequence using the same sensor.

Figure 4:
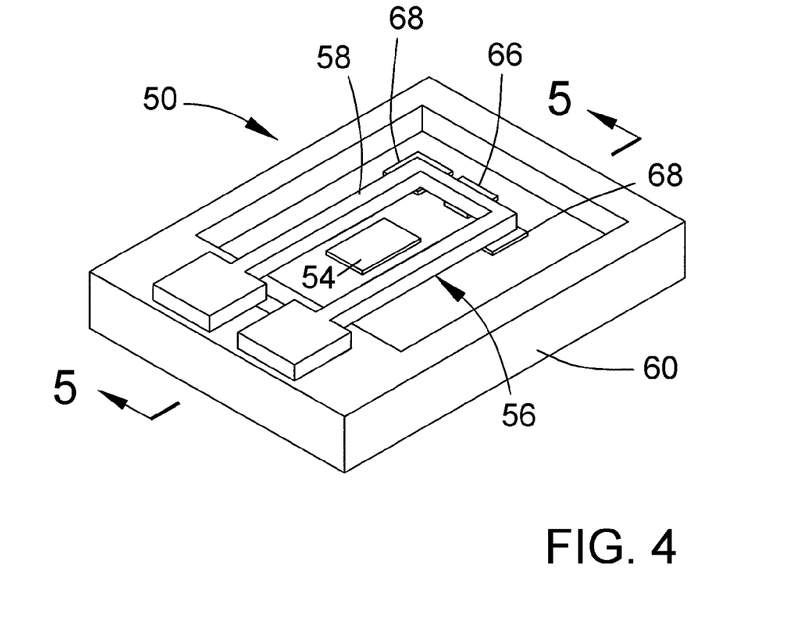
FIGS. 4 and 5 schematically represent one form of sensing element for use in the sensor units of FIGS. 1 through 3.
Figure 5:
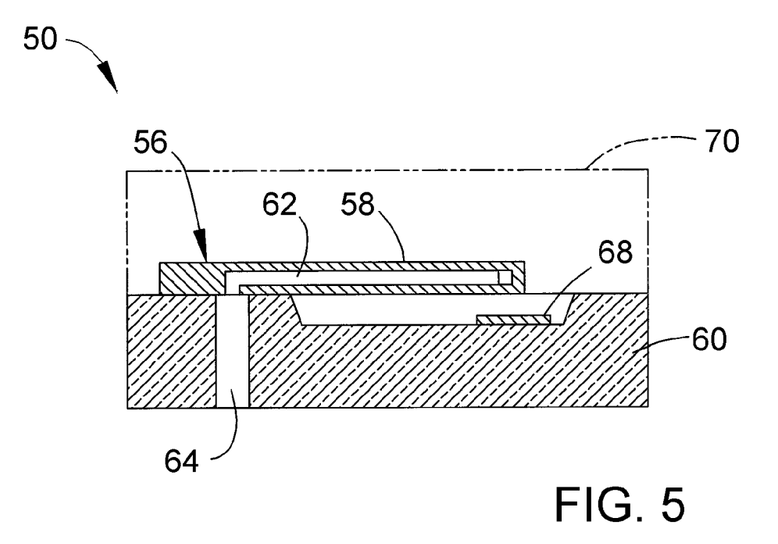

A particular but nonlimiting example of a MEMS chip 50 and sensing element 56 is represented in FIGS. 4 and 5. The tube 58 of the sensing element 56 serves as a conduit through which fluid flows as it flows between the inlet and outlet ports 32 and 34 of the sensor unit housing 22. According to this embodiment of the invention, the sensing element 56 and its tube 58 are part of a Coriolis mass flow, density, or chemical concentration sensor, generally as taught in commonly-assigned U.S. Pat. No. 6,477,901 to Tadigadapa et al., whose discussion of the construction and operation of a Coriolis sensor is incorporated herein by reference. In Tadigadapa et al., wafer bonding and silicon etching techniques are used to micromachine the tube 58 as a freestanding structure suspended over a silicon substrate 60. The freestanding tube 58 is vibrated at resonance such that, as fluid flows through an internal passage 62 within the tube 58, the tube 58 twists under the influence of the Coriolis effect. The amplitude of vibration is preferably adjusted through a drive electrode 66 located beneath the tube 58 on the surface of the substrate 60, while sensing electrodes 68 provide feedback to enable the vibration frequency and amplitude to be controlled with the circuitry 24 within the sensor unit 12. As explained in Tadigadapa et al., the degree to which the tube 58 twists (deflects) when vibrated can be correlated to the mass flow rate of the fluid flowing through the tube 58 on the basis of the change in the amplitude of a secondary resonant vibration mode. The natural frequency and gain of the fluid-filled vibrating tube 58 varies with the density, chemical concentration, and/or viscosity of a fluid flowing through the tube 58, such that controlling the vibration of the tube 58 to maintain a frequency at or near its resonant frequency will result in the vibration frequency changing if the density, chemical concentration, and/or viscosity of the fluid flowing through the tube 58 changes. FIG. 5 schematically represents the sensing element 56 enclosed by a cap 70 so that the resulting enclosure can be evacuated to enable the tube 58 to be driven efficiently at high Q values without damping.

Advantageous aspects of the resonating sensing element 56 described above include its very small size and its ability to precisely measure extremely small amounts of fluids, in contrast to prior art Coriolis-type flow sensors. Furthermore, the sensing element 56 can attain flow rate measurement accuracies of under +/−1%, and can sense extremely low flow rates (e.g., less than 1 ml/hr). Because of its tube configuration, the sensing element 56 also has a bidirectional flow capability that enables the sensor unit 12 to detect incorrect flow direction.

Figure 6:
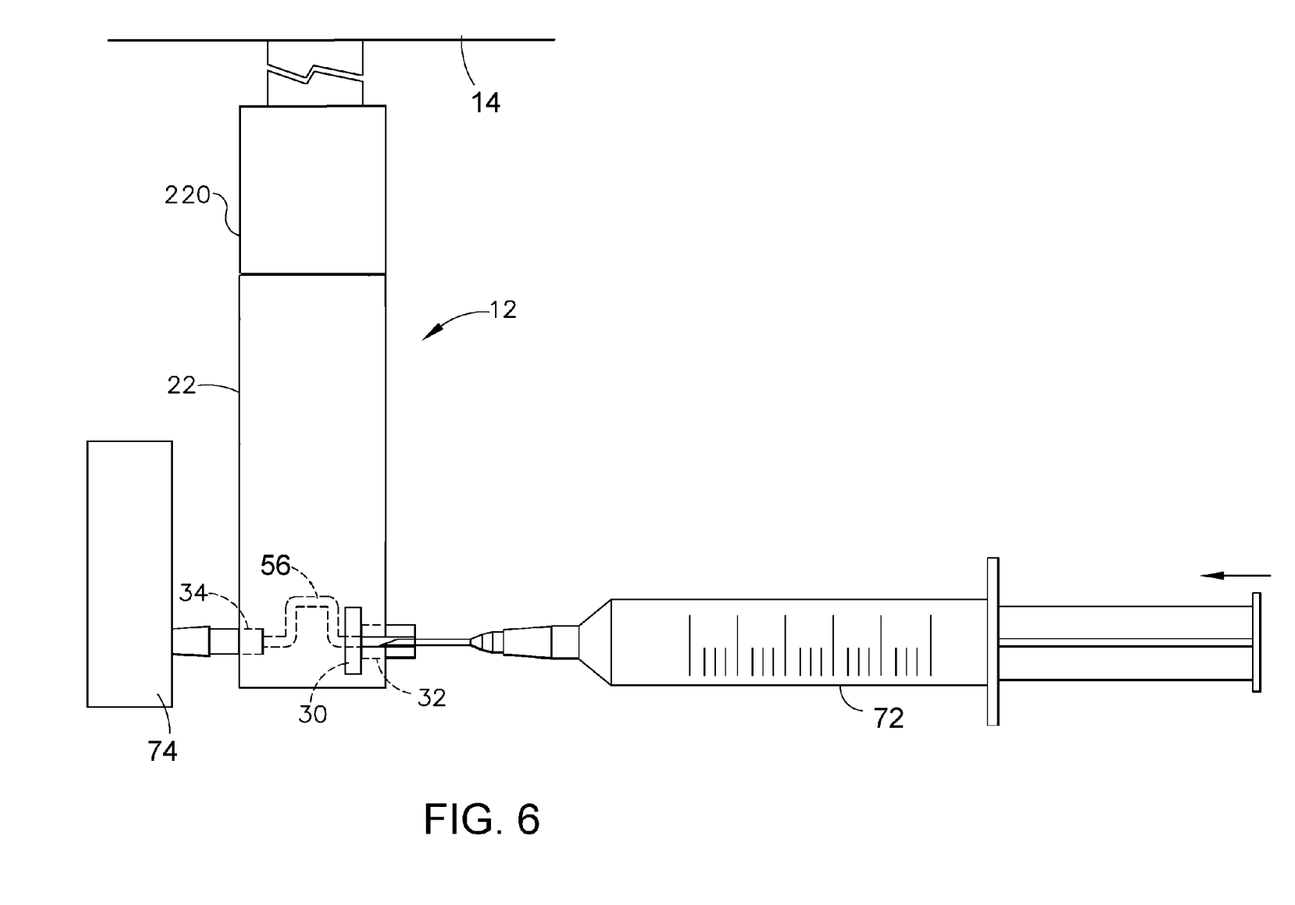
FIG. 6 schematically represents a technique for introducing a material into one of the sensor units of FIGS. 1 through 5.

FIG. 6 shows the sensor unit 12 of FIG. 2 as being loaded with a fluid sample using a syringe 72, and the fluid as being expelled into a waste container 74. Other sources and modes of introducing the fluid include bulbs, pipettes, multi-sample feed systems, and other fluid extracting and manipulating device can be integrated into the system 10. A splash shield (not shown) can be built into the sensor unit 12 to protect the computer 14 from liquid chemicals. FIG. 6 also represents a USB cable connection 220 between the sensor unit 12 and computer 14, which may be of any length sufficient to isolate the computer 14 from any hazardous chemicals or high temperatures to which the sensor unit 12 is being subjected.

Sensor units 12 for use with this invention are primarily dedicated to performing sensing or detecting tasks, optionally limited analysis tasks such as amplifying, sorting, and filtering the sensed output, and then communicating the sensed output to the computer 14. In preferred embodiments in which the USB-type connectors 20 and 120 are employed, the computer 14 can be used to supply all of the power required by the sensor unit 12 (for example, 500 mA at 5V for a laptop USB). Alternatively or in addition, power may be provided (totally or partially) by other sources (not shown), including but not limited to a battery within the housing 22, a plug-in power supply, or an additional USB connector. The connectors 20 and 120 preferably provide a bidirectional communication capability, by which not only is output from the sensor unit 12 transferred to the computer 14, but also instructions are transferred from the computer 14 to the sensor unit 12. An algorithm for operating the sensor unit 12 can be stored in memory 26 on the PCB 24 of the sensor unit 12, or in the memory of the computer 14 to reduce the size, power consumption, and cost of the sensor unit 12, or a combination of both.

A preferred aspect of the invention is that the sensor unit 12 is, by itself, inoperable without being connected to the computer 14 (or similar electronic unit, as discussed previously). The computer 14 is preferably required for powering and controlling the sensor unit 12, providing user input to the sensor unit 12 via the computer keyboard, an Internet link, or a wireless device, processing, manipulating, and displaying the output obtained from the sensor unit 12, and transmitting the output to remote locations (e.g., the remote devices 16) via wireless or wired communication links. An algorithm stored on the memory 26 of the sensor unit 12 can be uploaded to the computer 14 to enable the computer 14 to perform the display, user interface, and data manipulation functions. Alternatively, portions of or an entire computer program can be loaded into the memory of the computer 14 via other means, including but not limited to compact disks (CD's), a memory stick, or via the Internet. The computer program can then be run on the computer 14 to control the operation of the sensor unit 12 and its sensing element 56, as well as control the operation of its pump 30 and thermal element 54. As such, the sensor unit 12 is not required to have a large microprocessor, though it is foreseeable that a microprocessor on the PCB 24 may nonetheless be desirable for certain situations. The computer program preferably enables test duration, sampling and analysis to be tracked with the computer 14, and any alarms or warnings based on sensor output failing outside predetermined limits can be generated via the computer 14.

In view of the above, with the sensing and analysis system 10 of this invention, it is no longer necessary to provide a display, keypad, or control capability on a device performing a sensing function. Instead, all of these functions and operations are preferably performed with the computer 14. Data from the sensor unit 12 can be processed, stored, and printed with the computer 14 using well known programs such as Microsoft Excel®, Matlab®, etc. Graphs and real time sensor data can be displayed on the screen of the computer 14. Programs such as HyperTerminal®, Labview®, Labview Kernel®, Visual Basic® can be employed to show and manipulate the output of the sensor unit 12 on the computer screen. The computer keyboard can be used to provide input for initiate, modifying, and terminate the operation of the sensor unit 12, and to enter sample identification to better track multiple samples being tested or monitored over a period of time. The computer 14 can send raw and manipulated data to a printer, CD, disk, data stick, or other devices. Because all data, such as sensor output, concentrations, levels, quantities, quality, alarms, warnings, etc., are obtained and processed by the computer 14, the speed at which information concerning the sensor unit 12 and system 10 as a whole can be exchanged more rapidly.

The computer 14 also preferably provides the desirable capability for on-site calibration of the sensor unit 12 by the user (also called auto-calibration, re-calibration, auto-zeroing, etc.). A user is able to interface with the sensor unit 12 via the computer 14 (e.g., using the computer keypad) and initiate calibration which, for example, may involve the insertion of one or more standard liquids into the sensor unit 12. Calibration coefficients can be stored in the memory 26 of the PCB 24, and the PCB 24 may further carry simple calibration electronics for performing the calibration operation.

As noted above, the portable sensor units 12 of this invention may also include capabilities to control and maintain the temperature of the fluid under analysis to provide more accurate or repeatable analysis. With the control capability of the computer 14, a desired temperature can be programmed by the user via the computer 14. An additional power supply (not shown) may be employed to power the thermal element 54, which may be a Peltier or Joule heating unit. Alternatively, a second USB connector (not shown) can be used to deliver power to the thermal element 54. The temperature control capability can enable four to five digits of accuracy for density measurements in a range of about 15° C. to about 35° C.

The pump 30 of the sensor unit 12 can be integrated into the heating system or on the PCB 24 and use the same power source.

As previously noted, the system 10 of this invention is not limited to the use of a computer 14 as the device for operating the sensor unit 12 and providing access to a network 18, in that sensor units 12 of this invention can be connected to a variety of other electronic units, including portable units such as cellular telephones, satellite telephones, radios, PDA's, laptop or notebook PC's, etc. While sending sensor data via a computer or PDA data stream is well known in the art, cellular telephones can also transmit sensor data in a manner similar to text messages, photographs, and emails. The portability aspect of the invention provides considerable freedom in terms of where the analysis can be performed with the sensor unit 12. These portable devices and the sensor unit 12 connected to them can be powered by battery, fuel cell, AC from a wall socket, or a vehicle power.

While the sensing elements 56 depicted in FIGS. 2 through 4 are described as being adapted to sense properties and characteristics of fluids such as flow rate, density, specific gravity, chemical concentration, etc., the sensing element 56 of the sensor units 12 can be adapted to sense a variety of other parameters of fluids and non-fluids, including but not limited to one or more or any combination of the following: fluid quality, fluid age, fluid type, chemical composition, dissolved gases, pressure, temperature, humidity, viscosity, dynamic viscosity, refractive index, speed of sound, kinematic viscosity, flow, mass flow, pH, IR spectrum and absorption, fluorescence, radiation, conductivity, dielectric constant, motion, vibration, acceleration, and shock. A wide variety of fluid and non-fluid applications are also possible, including but not limited to sensing, measuring, and/or analyzing petrochemicals, fuels, fuel blends, beverages, beverage concentrations and blends, urine, urea, urology, hematology, blood, bodily fluids, pharmaceuticals, biological and biochemical agents, alcohol content and percentage, blood alcohol content (BAC), breath alcohol content (BrAC), octane, antifreeze, vehicular fluids, lubricants, paints, adhesives, pesticides, water, flavors, fragrances, methanol concentration, ethanol concentration, biodiesel blends, distilled petrochemicals, fermented liquids and drugs, Brix, Plato, humidity, pollutants, particles, biohazards, explosives, radiation, viruses, bacteria and other pathogens, and chemical toxins. A variety of sensors are known and capable of performing the above-noted sensing functions, including but not limited to microfluidic sensors, MEMS sensors, optical and infrared sensors and receivers, electrical capacitive sensors, resistive sensors, piezoresistive sensors, piezoelectric sensors, chemical sensors, metal oxide electrode and metal electrode sensors, resonators, SAW (standing acoustic wave) sensors, beam/paddle sensors, turbine sensors, pressure and differential pressure sensors, acoustic sensors, speed of sound sensors, refractive index sensors, gas chromatography (GC) sensors, mass-based sensors, magnetic sensors, electromagnetic sensors, fluorescence sensors, radiation sensors, attenuating and absorption sensing devices, spectral devices, and residual gas analyzers. Multiple sensing elements can be contained within or coupled to a single sensor unit 12, such that all sensing elements sample the same fluid stream in series. The sensor unit 12 can also be equipped with additional electrical interface ports (e.g., USB) by which additional sensor units 12 can be interfaced directly with the sensor unit 12, and their data relayed to the computer 14 through the sensor unit 12. The sensor unit 12 can also be provided with additional inlet and outlet ports to provide separate parallel fluid streams to separate sensing elements 56 within the housing 22.

A particular notable class of sensors that can be integrated into sensing units 12 of this invention include biochemical sensors, such as gas chromatograph and MEMS-based pumps and biosensors disclosed in U.S. Pat. Nos. 6,637,257 and 6,942,169 to Sparks, U.S. Pat. No. 7,008,193 to Najafi et al., M. Agah et al., "High Speed MEMS-based Gas Chromatography," IEEE Journal of MEMS, Vol. 15, p. 1371-1378 (October 2006), H. Kim et al., "Integrated Peristaltic Eighteen-Stage Electrostatic Gas Micro Pump with Active Microvalves," Solid State Sensor, Actuator and Microsystem Workshop, Hilton Head Island, S.C., p. 292-295 (June 2006), C. Lui et al., "Chamber Evaluation of a Portable GC with Tunable Retention and Microsensor-Array Detection for Indoor Air Quality Monitoring," Journal of Environmental Monitoring, Vol. 8, p. 270-278 (February 2006), the contents of which are incorporated herein by reference. A miniature or MEMS-based gas chromatograph can be employed to measure chemicals, including poisonous gases and pollutants, in very low concentrations. Gas chromatographs can be coupled with miniature pumps (e.g., pump 30) that pull the gases through the sensor unit 12 to separate and amplify different gas species. By using the power supplied from a USB port and the wireless or wired communications capability of portable laptops or cell phones, a network can be established to greatly expand the use of these miniature chemical sensors.

Another notable class of sensors includes MEMS-based radiation sensors and other miniature Geiger counters that have been developed. For example, see C. Eun et al., "Controlling Ultra Wide Band Transmission from a Wireless Micromachined Geiger Counter," IEEE Int'l. Conference on MEMS, Istanbul, Turkey, p. 570-573 (January 2006), the contents of which are incorporated herein by reference.

Particular examples of sensors capable of sensing pressure, temperature, humidity, and other conditions and parameters associated with weather include numerous MEMS-based pressure sensors, temperature sensors, wind anemometers, and humidity sensors, as disclosed in U.S. Pat. No. 5,936,164 to Sparks et al., U.S. Pat. No. 5,706,565 to Sparks et al., U.S. Pat. No. 5,663,508 to Sparks, D. Sparks et al., "Coriolis Mass Flow, Density and Temperature Sensing with a Single Vacuum Sealed MEMS Chip," Solid-State Sensors and Actuator, and Microsystem Workshop, Hilton Head, S.C., p. 75, (June 2004), C. Lui et al., "Chamber Evaluation of a Portable GC with Tunable Retention and Microsensor-Array Detection for Indoor Air Quality Monitoring," Journal Environmental Monitoring, Vol. 8, p. 270-278 (February 2006), the contents of which are incorporated herein by reference.

Notable examples of chemical concentration sensors include blood alcohol content (BAC) and breath alcohol content (BrAC) sensors, such as BAC and BrAC sensors, sensing elements, and methods described in U.S. Pat. Nos. 4,039,852, 5,907,407, 4,820,386, and 7,095,501, the contents of which are incorporated herein by reference. A sensor unit 12 containing one or more sensing elements capable of sensing BAC and BrAC can be implemented for direct use on individuals, for example, an individual's breath or blood is transported directly through the sensor unit 12, or implemented as a passive sensor, for example, by sampling the breath of an individual within an enclosed area such as the passenger compartment of a vehicle. In the latter example, the computer 14 can be the vehicle's onboard computer.

The sensing and analysis system 10 of this invention is well suited for use in a distributed network (e.g., 18 in FIG. 1) to continuously or periodically monitor any of the above-note parameters and conditions. For example, the system 10 can be employed in a network 18 to continuously or periodically monitor environmental conditions, including airborne pollutants (chemicals, solvents, $CO_2$, soot, etc) in air samples drawn into multiple units 12 with their respective pumps 30. Governmental personnel, scientists, and the public can employ sensor units 12 of this invention with their mobile or stationary computers and communication devices to monitor air quality. With the use of the pump 30, syringe 72, pipette, or functionally similar devices, water sources can also be continuously or periodically sampled in the same manner. For a particular site, multiple sensor units 12 could be employed with one or more data processing devices, such as a laptop, to test the air, water, food, beverage, and/or soil samples over time. Weather data, such as temperature, humidity, barometric pressure, wind speed, light levels, etc., can also be gathered with multiple sensor units 12 in the same way.

Any number of sensor units 12 can also be deployed over a geographical area of essentially any size to test and monitor the environment for biochemical warfare agents, radiation, explosives, pathogens, etc., with the network 18 providing an expansive detection system linked to cell phones, radio, computers, laptops, PDA's and other portable military and civilian electronic devices. With such a capability, a dense distributed sensor network 18 of sensor units 12 could be used by first responders, police, and defense department personnel to track a wide variety of potential hazards in an urban environment where cell phone and Internet networks already exist.

Similarly, biological applications for the system 10 and network 18 of this invention include testing and monitoring humans, animals, and plants for biological and physiological conditions and parameters, including but not limited to sensing and measuring glucose in blood, blood and glucose in urine, alcohol in blood, urine, or breath, white and red blood cell counts, cytometry, DNA and RNA analysis, and pathogen and biochemical agent detection in air and water. The invention enables these tests to be conducted anywhere a computer 14 or other portable computing device, such as a laptop, PDA, or cellular telephone, can be transported or placed. Data from these tests can be sent to a doctor or other caregiver of the network 18. Furthermore, with a dense distributed sensor network 18 of sensor units 12, airborne and blood borne pathogens and antigens could be tracked in air sampled from a medical facility. A network 18 of sensor units 12 can also be employed to monitor the presence of pathogens in blood, urine, and cellular fluids at a medical facility, which over time and area can be used to track a pandemic or disease outbreak. Medical facilities could also sample and track the spread of pathogens responsible for nosocomial infections with airborne and specimen tests.

As previously noted, a breath alcohol content (BrAC) sensor unit 12 can be installed in a passenger vehicle to obtain samples directly from individuals (e.g., the driver or passengers) or draw air samples from the passenger compartment, then interface with the vehicle's onboard computer. A network 18 can be established with the system 10 by employing the communications capabilities of the vehicle (radio, satellite, cellular telephone, etc.) as well as cell phones, so that data collected by the sensor unit 12 can be transmitted to remote devices 16. Such a network 18 can be a law enforcement network, and the system 10 used to discourage or prevent driving under the influence.

The sensing and analysis system 10 of this invention can also find use in routine industrial applications. For example, sales personnel and field service engineers can employ the system 10 and network 18 to gather data from equipment and chemicals delivered by their company to customers, and chemists and quality control personnel can continuously gather data within a plant or refinery.

In each of the applications noted above, a threshold level can be set for the output of the sensor unit 12, which when exceeded triggers a message or signal that can be sent via a land line, email, wirelessly, or through a wired connection to the remote devices 16. Such an event-based alerting system has many advantages over continuous monitoring systems, for example, the user need not continuously monitor the sensing and analysis system 10 of this invention, but instead is informed when a measured parameter is outside a predetermined safe limit.

Because the sensor unit 12 is linked to a data processing device (14 or 16) that in many cases already has a communication capability, either wirelessly (over wireless networks, cellular towers, satellites, local wireless laptop antennas, radios, etc.) or land lines (over telephone lines, cable lines, network servers, etc.), the invention is well suited for being implemented as a distributed network 18 of sensor units 12 over a wide geographic area. Each sensor unit 12 in the network 18 can perform the same function at different sites, or the network 18 can be composed of sensor units 12 with multiple different types of sensing capabilities at the same or different sites. The data from the sensor units 12 can be sent to a central location or multiple locations (e.g., computers) for data analysis in real time or over time. Many data processing devices with which the sensor unit 12 can be used—cellular phones, PDA's, laptops, satellite phones, radios, etc.—are mobile, such that the geographic sampling area for a given sensor unit 12 can vary with time. Each sensor unit 12 can cover an area and, with multiple sensor units 12 in a distributed (multi-user) network 12, even larger geographic areas can be sampled. As such, the network 18 containing the sensing and analysis system 10 of this invention can operate locally—within a building, stadium, city—or broadly over a country or even globally, because of the ubiquitous nature of portable electronic devices such as cell phones, PDA's, radios, and laptops linked by cellular towers, land lines, telephone lines, cable lines, satellites, local wireless laptop antennas, servers, radios, etc. Future electronic devices, including smart music devices (IPOD's), cameras, televisions, radios, etc., will also be capable of forming part of the network 18. In each of the above scenarios, data obtained with the sensing and analysis system 10 and network 18 of this invention can be used to supplement other sources of data, such as conventional laboratories, to enhance the statistical data for a better understanding of a phenomenon of interest.

The ability to create a network 18 as described above is greatly enhanced by the elimination within the sensor unit 12 of a separate on-board power supply and network communication device. Because power and communication capabilities are provided by a data processing device (the computer 14 or other device noted above) to which the unit 12 is linked, the size and complexity of the sensor unit 12 is greatly reduced in comparison to existing sensing and analysis systems, and by leveraging existing communication devices makes possible a much larger yet less expensive sensor network.

While the invention has been described in terms of certain embodiments, it is apparent that other forms could be adopted by one skilled in the art. Therefore, the scope of the invention is to be limited only by the following claims.

The invention claimed is:

1. A sensing and analysis system comprising:
   a portable sensor unit comprising a housing, a sensing element within the housing and operable to sense an input and generate an output signal responsive to the input, and electronic circuitry within the housing and in communication with the sensing element;

an electronic unit physically separable from the sensor unit and providing power to the sensor unit for operation of the sensing element and the electronic circuitry, generating instructions for controlling the electronic circuitry to initiate, modify, and terminate the operation of the sensor unit, receiving the electrical output from the sensor unit, processing the electrical output, and transmitting the electrical output to remote locations;

means for providing communication between the electronic circuitry and the electronic unit by which the instructions generated by the electronic unit are delivered to the sensor unit and the electrical output from the sensor unit is delivered to the electronic unit; and means for delivering power from the electronic unit to the sensor unit;

wherein the electronic circuitry performs tasks limited to communicating the instructions from the electronic unit to the sensor unit, producing an electrical output based on the output signal generated by the sensing element, and optionally amplifying, sorting and filtering the output signal to produce the electrical output; and wherein the communication providing means and the power delivering means are configured for selectively connecting and disconnecting the sensor unit and the electronic unit to initiate and terminate communication with and powering of the sensor unit.

2. The sensing and analysis system according to claim 1, wherein the communication providing means comprises a cable over which the electrical output of the electronic circuitry is delivered to the electronic unit, and the instructions from the electronic unit are delivered to the sensor unit.

3. The sensing and analysis system according to claim 1, wherein the communication providing means comprises a serial interface device operable to deliver the electrical output of the electronic circuitry to the electronic unit, and deliver the instructions from the electronic unit to the sensor unit.

4. The sensing and analysis system according to claim 1, wherein the communication providing means and the power delivering means comprise at least one universal serial bus connector operable to deliver the electrical output of the electronic circuitry to the electronic unit, deliver the instructions from the electronic unit to the sensor unit, and deliver power from the electronic unit to the sensor unit.

5. The sensing and analysis system according to claim 4, wherein the universal serial bus connector further comprises a cable.

6. The sensing and analysis system according to claim 1, wherein the communication providing means comprises means for wirelessly sending the electrical output of the electronic circuitry to the electronic unit, and means for wirelessly sending the instructions from the electronic unit to the sensor unit.

7. The sensing and analysis system according to claim 1, wherein the electronic unit comprises a communication port configured to receive and physically couple with the communication providing means of the sensor unit.

8. The sensing and analysis system according to claim 1, wherein the electronic unit comprises means for manipulating the electrical output of the sensor unit.

9. The sensing and analysis system according to claim 1, wherein the electronic unit comprises means for displaying the manipulated electrical output of the sensor unit.

10. The sensing and analysis system according to claim 1, wherein the electronic unit comprises user interface means for generating the instructions for the sensor unit.

11. The sensing and analysis system according to claim 1, wherein the electronic unit comprises means for calibrating the sensor unit.

12. The sensing and analysis system according to claim 1, wherein the electronic unit comprises memory storage means that stores an algorithm for controlling the sensor unit.

13. The sensing and analysis system according to claim 1, wherein the sensor unit comprises memory storage means that stores an algorithm for controlling the sensor unit.

14. The sensing and analysis system according to claim 13, wherein the sensor unit comprises means for uploading the algorithm from the memory storage means to the electronic unit.

15. The sensing and analysis system according to claim 1, wherein each of the electronic unit and the sensor unit comprises memory storage means that stores algorithms for controlling the sensor unit.

16. The sensing and analysis system according to claim 1, wherein the sensor unit does not contain a power source within the housing for powering the sensor unit and the electronic unit supplies all of the power required by the sensor unit.

17. The sensing and analysis system according to claim 1, wherein the sensor unit comprises a battery within the housing for powering the sensing element and the electronic circuitry.

18. The sensing and analysis system according to claim 1, wherein the electronic unit is selected from the group consisting of personal computers, workstations, computers, laptops, PDA's, radios, cellular phones, and satellite phones, and the electronic unit is within a network that enables network communications therewith.

19. The sensing and analysis system according to claim 18, wherein the sensor unit does not contain within the housing means for network communication other than through the electronic unit.

20. The sensing and analysis system according to claim 18, wherein the network further comprises a plurality of sensor units as recited in claim 1 and a plurality of electronic units as recited in claim 1, each of the plurality of sensor units communicating with at least one of the plurality of electronic units so that instructions generated by the plurality of electronic units are delivered to the plurality of sensor units and the electrical outputs from the plurality of sensor units are delivered to the plurality of electronic units, and the network enables communication between the plurality of electronic units.

21. The sensing and analysis system according to claim 20, wherein the network comprises means for linking the plurality of electronic units for communication therebetween within the network, the linking means being selected from the group consisting of cellular towers, land lines, telephone lines, cable lines, satellites, local wireless laptop antennas, network servers, and radios.

22. The sensing and analysis system according to claim 1, wherein the sensing element is selected from the group consisting of microfluidic sensors and receivers, MEMS sensors and receivers, optical sensors and receivers, infrared sensors and receivers, electrical capacitive sensors, resistive sensors, piezoresistive sensors, piezoelectric sensors, chemical sensors, metal oxide electrode sensors, and metal electrode sensors, resonators, resonating tubes, SAW sensors, beam/paddle sensors, turbine sensors, pressure sensors, differential pressure sensors, acoustic sensors, speed of sound sensors, refractive index sensors, gas chromatography sensors, mass-based sensors, magnetic sensors, electromagnetic sensors, radiation sensors, attenuating and absorption devices, spectral devices, diffraction and diffraction grating-based chemical sensors, blood alcohol sensors, breath alcohol sensors, and residual gas analyzers.

23. The sensing and analysis system according to claim 1, wherein the sensor unit further comprises:
 an inlet for receiving and delivering a material to the sensing element; and
 an outlet for receiving the material from the sensing element and discharging the material from the housing;
 wherein the input to which the sensing element is responsive is a characteristic of the material and the output signal generated by the sensing element corresponds to the characteristic of the material.

24. The sensing and analysis system according to claim 23, wherein the characteristic to which the sensing element is responsive is selected from the group consisting of chemical identity, chemical concentration, chemical composition, density, specific gravity, flow rate, viscosity, pH, conductivity, material quality, dissolved gases, pressure, temperature, refractive index, dielectric constant, speed of sound, spectra, infrared spectra, infrared absorption, fluorescence, optical absorption, and diffraction.

25. The sensing and analysis system according to claim 24, wherein the material is a fluid selected from the group consisting of air, water, chemicals, beverages, bodily fluids, blood, breath, urine, and saliva, the characteristic to which the sensing element is responsive is at least one selected from the group consisting of biohazards, explosives, environmental pollutants, radiation, chemical toxins, biological indicators, medical conditions, DNA, RNA, bodily fluids, chemicals, cells, spores, antigens, pathogens, and alcohol, and the sensor unit is operable to perform at least one operation selected from the group consisting of detecting, monitoring, amplifying, sorting, filtering, analyzing, and measuring the characteristic.

26. A sensing and analysis system comprising:
 a portable sensor unit comprising a housing, a sensing element within the housing and responsive to an input, and electronic circuitry within the housing and in communication with the sensing element, the electronic circuitry producing an electrical output based on an output signal generated by the sensing element;
 an electronic unit physically separate from the sensor unit and capable of generating instructions for the sensor unit, receiving the electrical output from the sensor unit, processing the electrical output, and transmitting the electrical output to remote locations;
 means for providing communication between the electronic circuitry and the electronic unit by which instructions generated by the electronic unit are delivered to the sensor unit and the electrical output from the sensor unit is delivered to the electronic unit; and
 means for delivering power from the electronic unit to the sensor unit;
 wherein the sensor unit further comprises:
 an inlet for receiving and delivering a material to the sensing element; and
 an outlet for receiving the material from the sensing element and discharging the material from the housing;
 and wherein the input to which the sensing element is responsive is a characteristic of the material, the output signal generated by the sensing element corresponds to the characteristic of the material, the material analyzed by the sensor unit is a fluid, and the sensing element comprises:
 a freestanding tube through which the fluid flows;
 means for vibrating the freestanding tube at a resonant frequency and gain thereof that varies with the density, chemical concentration and viscosity of the fluid flowing therethrough, the Coriolis effect causing the freestanding tube to twist to a degree that varies with the mass flow rate of the fluid flowing therethrough while the freestanding tube is vibrated at resonance; and
 means for sensing movement of the freestanding tube to sense the resonant frequency and the degree of twist of the freestanding tube as the fluid flows therethrough.

27. The sensing and analysis system according to claim 23, further comprising means for fluidically coupling a fluid source to the inlet of the sensor unit.

28. The sensing and analysis system according to claim 23, further comprising means for fluidically coupling a receptacle to the outlet of the sensor unit.

29. The sensing and analysis system according to claim 23 wherein the sensor unit further comprises means for pumping the material through the sensing element.

30. The sensing and analysis system according to claim 29, wherein the pumping means is integrated onto the sensor unit and powered by the electronic unit.

31. The sensing and analysis system according to claim 1, wherein the sensor unit is a gas chromatograph sensor.

32. The sensing and analysis system according to claim 1, wherein the sensor unit is a Geiger counter.

33. The sensing and analysis system according to claim 1, wherein the sensor unit is a blood or breath alcohol content sensor.

34. The sensing and analysis system according to claim 1, wherein the input to which the sensing element is responsive is selected from the group consisting of magnetic field, motion, acceleration, shock, vibration, temperature, pressure, mass, gravity, infrared detection, electromagnetic field, radiation, dielectric constant, refractive index, conductivity, resistivity, thermal properties, and optical properties.

35. The sensing and analysis system according to claim 1, wherein the sensor unit further comprises means for altering the temperature of the sensing element.

36. The sensing and analysis system according to claim 35, wherein the electronic unit comprises means for controlling the temperature altering means of the sensing element.

37. The sensing and analysis system according to claim 1, further comprising means for providing communication between the sensor unit and a second sensor unit having a sensing element responsive to a second input.

38. The sensing and analysis system according to claim 1, wherein the electronic unit comprises and the sensor unit does not contain within the housing thereof means for powering the sensor unit, means for manipulating the electrical output of the sensor unit, means for displaying the electrical output of the sensor unit, means for controlling the electrical output of the sensor unit, and memory storage means that stores an algorithm for controlling the sensor unit.

39. A sensing and analysis method comprising:
 providing a portable sensor unit and an electronic unit physically separable from the sensor unit, the portable sensor unit comprising a housing, a sensing element within the housing and operable to sense an input and generate an output signal responsive to the input, and electronic circuitry within the housing and in communication with the sensing element;
 connecting the sensor unit to the electronic unit so as to provide a bidirectional communication capability and deliver power from the electronic unit to the sensor unit;
 operating the electronic unit to deliver power from the electronic unit to the sensor unit for operation of the sensing element and the electronic circuitry, generate instructions to control the electronic circuitry to initiate, modify, and terminate the operation of the sensor unit, cause the electronic circuitry to perform tasks limited to communicating the instructions from the electronic unit to the sensor unit, produce an electrical output based on the output signal generated by the sensing element, and optionally amplify, sort and filter the output signal to produce the electrical output, receive and process the electrical output from the sensor unit, and transmit the electrical output and/or the processed electrical output to remote locations; and then physically disconnecting the sensor unit from the electronic unit to terminate communication with and powering of the sensor unit.

40. The sensing and analysis method according to claim 39, wherein the electronic unit is selected from the group consisting of personal computers, workstations, computers, laptops, PDA's, cellular phones, and satellite phones.

41. The sensing and analysis method according to claim 39, wherein the electronic unit is within a network that enables network communications with the electronic unit, and the sensor unit does not contain within the housing thereof means for network communication other than through the electronic unit.

42. The sensing and analysis method according to claim 39, wherein the sensor unit does not contain within the housing thereof means for powering the sensor unit, means for manipulating the electrical output of the sensor unit, means for displaying the electrical output of the sensor unit, means for controlling the electrical output of the sensor unit, and memory storage means.

43. The sensing and analysis method according to claim 39, wherein the power is delivered to the sensor unit and the electrical output is communicated to the electronic unit via a universal serial bus connector on the sensor unit.

44. The sensing and analysis method according to claim 39, wherein the input is an environmental condition.

45. The sensing and analysis method according to claim 44, wherein the environmental condition is selected from the group consisting of biochemical agents, radiation, explosives, pathogens, pollutants, biohazards, chemical toxins, and weather conditions in the environment.

46. The sensing and analysis method according to claim 39, wherein the input is a physiological condition, biological substance, a property of a biological substance of a human, or a substance in a biological substance of a human.

47. The sensing and analysis system according to claim 1, wherein the sensing element is a MEMS device.

48. The sensing and analysis system according to claim 1, wherein the sensor unit is a handheld unit capable of being physically supported by the electronic unit.

49. The sensing and analysis method according to claim 39, wherein the sensing element is a MEMS device.

50. The sensing and analysis method according to claim 39, wherein the sensor unit is a handheld unit capable of being physically supported by the electronic unit.

* * * * *